United States Patent
Liu et al.

(10) Patent No.: US 12,532,860 B2
(45) Date of Patent: Jan. 27, 2026

(54) ***FLAMMLINA FILIFORMIS* "JIN JIN NO.1" WITH FRUITING BODY OF GOLDEN CAP AND WHITE STIPE**

(71) Applicant: Shanxi Agricultural University, Shanxi (CN)

(72) Inventors: Jingyu Liu, Shanxi (CN); Mingchang Chang, Shanxi (CN); Bing Deng, Shanxi (CN); Junlong Meng, Shanxi (CN); Ludan Hou, Shanxi (CN); Min Zhang, Shanxi (CN)

(73) Assignee: Shanxi Agricultural University, Taiyuan (CN)

( * ) Notice: Subject to any disclaimer, the term of this patent is extended or adjusted under 35 U.S.C. 154(b) by 198 days.

(21) Appl. No.: 18/458,171

(22) Filed: Aug. 30, 2023

(65) Prior Publication Data
US 2024/0130324 A1    Apr. 25, 2024
US 2024/0224925 A9    Jul. 11, 2024

(30) Foreign Application Priority Data

Oct. 25, 2022 (CN) .......................... 202211308885.2

(51) Int. Cl.
*A01H 15/00* (2006.01)

(52) U.S. Cl.
CPC .................................... *A01H 15/00* (2013.01)

(58) Field of Classification Search
CPC ..................................................... A01H 15/00
See application file for complete search history.

(56) References Cited

PUBLICATIONS

Advances in Plant Breeding Strategies: Vegetable Crops vol. 10: Leaves, Flowerheads, Green Pods, Mushrooms and Truffles Jamell M. Al-Khayri, S. Mohan Jain and Dennis V. Johnson Editors Springer Nature AG, Switzerland (Year: 2021).*

* cited by examiner

*Primary Examiner* — David H Kruse

(57) ABSTRACT

Disclosed is a *Flammlina filiformis* with a fruiting body of a golden cap and a white stipe. The *Flammlina filiformis* has a strain number of "Jin Jin No. 1" and has been preserved on Jun. 16, 2022 at the China General Microbiological Culture Collection Center with a registration number of CGMCC No. 40222. Colors of the cap and the stipe of the *Flammlina filiformis* "Jin Jin No. 1" have obvious differences. Compared with a parent white *Flammlina filiformis* strain F0012, the *Flammlina filiformis* "Jin Jin No. 1" has an equivalent average yield, an initial harvest period 1-2 days late, and a golden cap.

4 Claims, 5 Drawing Sheets

FLAMMLINA FILIFORMIS "JIN JIN NO.1" WITH FRUITING BODY OF GOLDEN CAP AND WHITE STIPE

CROSS-REFERENCE TO RELATED APPLICATIONS

This application claims the benefit and priority of Chinese Patent Application No. 202211308885.2, entitled "FLAMMLINA *FILIFORMIS* "JIN JIN NO. 1" WITH FRUITING BODY OF GOLDEN CAP AND WHITE STIPE" filed with the China National Intellectual Property Administration on Oct. 25, 2022, the entire disclosure of which is incorporated herein by reference as part of the present application.

TECHNICAL FIELD

The present disclosure relates to the field of edible fungi cultivation, in particular to a *Flammlina filiformis* "Jin Jin No. 1" with a fruiting body of a golden cap and a white stipe.

BACKGROUND

*Flammlina filiformis*, known in English as Winter Mushroom, and Golden Mushroom, taxonomically, belongs to the *Flammulina, Tricholomataceae, Agaricales, Basidiomycetes, Basidiomycota*, and is the second largest edible fungi of factory production in the world after *Agaricus bisporus*.

*Flammlina filiformis* has been commercially cultivated for more than 30 years. At present, the main production mode of *Flammlina filiformis* has been changed from bag cultivation to bottle cultivation factory production. In recent years, with the change of market demand, the phenomenon of product homogenization is serious. It is an inevitable trend of industrial development to breed characteristic *Flammlina filiformis* varieties by variety breeding methods. However, there are some problems in the breeding of *Flammlina filiformis* in China. Firstly, the existing *Flammlina filiformis* varieties in China come from foreign introduced or wild domesticated species, with narrow genetic backgrounds, so it is difficult to improve the varieties by traditional breeding methods. Secondly, the lack of analysis of cytoplasmic inheritance of *Flammlina filiformis* leads to the serious delay in the restoration and improvement of germplasm.

Edible fungi are eukaryotes with sexual reproduction, and mitochondrial inheritance in eukaryotes with sexual reproduction is very important for biological growth and development. Recent research results also show that fungal cytoplasm will have an important impact on nuclear autonomy, gene expression, gene mutation and evolution. In recent years, based on the collection and genetic analysis of *Flammlina filiformis* strains, an Edible Fungi Team of Shanxi Agricultural University has bred a new specific *Flammlina filiformis* with a golden cap and a white stipe, mainly based on a breeding method established in the authorized national invention patent ZL201710355494.9 (A METHOD FOR BREEDING PALE YELLOW *FLAMMLINA FILIFORMIS*, with an authorization announcement number of 107142257B and an authorization announcement date of Oct. 9, 2020).

SUMMARY

The technical problem to be solved by the present disclosure is to provide a new color specific *Flammlina filiformis* cultivar (a strain and a fungal thereof).

In order to solve the above technical problem, the present disclosure provides a *Flammlina filiformis* "Jin Jin No. 1" with a fruiting body of a golden cap and a white stipe.

The *Flammlina filiformis* strain "Jin Jin No. 1" provided by the present disclosure has a registration number of CGMCC No. 40222 in the China General Microbiological Culture Collection Center (hereinafter referred to as CGMCC). The strain has been preserved at the CGMCC on Jun. 16, 2022 at No. 3, Yard 1, Beichen West Road, Chaoyang District, Beijing, and the postcode is 100101. *Flammlina filiformis* is hereinafter referred to as "Jin Jin No. 1".

"Jin Jin No. 1" is a fertile heterokaryotic strain which uses main cultivated strains of yellow *Flammlina filiformis* F0027 (an original strain named "San Ming No. 1") and main cultivated strain of white *Flammlina filiformis* F0012 (derived from isolated strains of fruiting body tissues of variety "FV088" introduced from Japan by factory production enterprises in Shanxi Province) as starting strains, based on the authorized national invention patent ZL201710355494.9 (A METHOD FOR BREEDING PALE YELLOW *FLAMMLINA FILIFORMIS*, with an authorization announcement number of 107142257B and an authorization announcement date of Oct. 9, 2020), and undergoes steps of determination of polarity of mononuclear hyphae, population construction, change of receptor cytoplasm and optimization of fruiting.

The hyphae morphology of "Jin Jin No. 1" strain is semi-aerial type, the fruiting body cap has a golden cap with an oblate longitudinal section and a moderate inward curling degree, and the cap is uniform in size and difficult to open. The whole stipe is white with high color uniformity, and there is no browning at a base during growth.

The fruiting body, the mycelium and/or spores of "Jin Jin No. 1" also fall within the protection scope of the present disclosure.

A protoplast of "Jin Jin No. 1" also falls within the protection scope of the present disclosure.

A *Flammlina filiformis* stick containing "Jin Jin No. 1" also falls within the protection scope of the present disclosure.

The application of "Jin Jin No. 1" in the preparation of a *Flammlina filiformis* fruiting body and/or a *Flammlina filiformis* mycelium and/or *Flammlina filiformis* spores also falls within the protection scope of the present disclosure.

The application of "Jin Jin No. 1" in the breeding of *Flammlina filiformis* also falls within the protection scope of the present disclosure.

In the application, the breeding of *Flammlina filiformis* can be to cultivate *Flammlina filiformis* with specific colors.

The present disclosure further provides a cultivation method for "Jin Jin No. 1".

The cultivation method for "Jin Jin No. 1" provided by the present disclosure includes a step of fruiting culture.

Herein, the fruiting culture may be carried out in the form of three-dimensional shelf fruiting, ground-based vertical fruiting or soil-covered fruiting.

Experiments show that the fruiting body cap of *Flammlina filiformis* "Jinjin No. 1" of the present disclosure is golden, and the whole stipe is white, and the colors of the cap and the stipe have obvious differences. Compared with a parent white *Flammlina filiformis* strain F0012, the *Flammlina filiformis* "Jin Jin No. 1" has an equivalent average yield, an initial harvest period 1-2 days late, and a golden cap. Different from a parent yellow *Flammlina filiformis* variety "San Ming No. 1" having a yellow stipe and a base being prone to browning during growth, the "Jin Jin No. 1"

has a white whole stipe and no browning at the base during growth and is more suitable for fresh market and special food processing.

PRESERVATION INSTRUCTIONS

Latin Name: *Flammlina filiformis*
Strain Number: Jin Jin No. 1
Preservation Institution: China General Microbiological Culture Collection Center
Abbreviation of Preservation Institution: CGMCC
Address: No. 3, Yard 1, Beichen West Road, Chaoyang District, Beijing
Preservation Date: Jun. 16, 2022
Registration Number in Preservation Institution: CGMCC No. 40222

DETAILED DESCRIPTION

The present disclosure will be further described in detail with reference to specific embodiments, and the examples are given only to illustrate the present disclosure, but not to limit the scope of the present disclosure. The examples provided below can be used as a guide for further improvement by those of ordinary skill in the art, and are not intended to limit the present disclosure in any way.

The experimental methods in the following examples, unless otherwise specified, are conventional methods, which are carried out according to the techniques or conditions described in the literature in the art or according to the product specifications. The materials and reagents used in the following examples can be obtained commercially unless otherwise specified.

Unless otherwise specified, the quantitative experiments in the following examples are all repeated three times, and the results are averaged.

Example 1. Breeding Process and Phenotype of *Flammlina filiformis* Strain "Jin Jin No. 1"

1. Breeding Process

Figure 1:
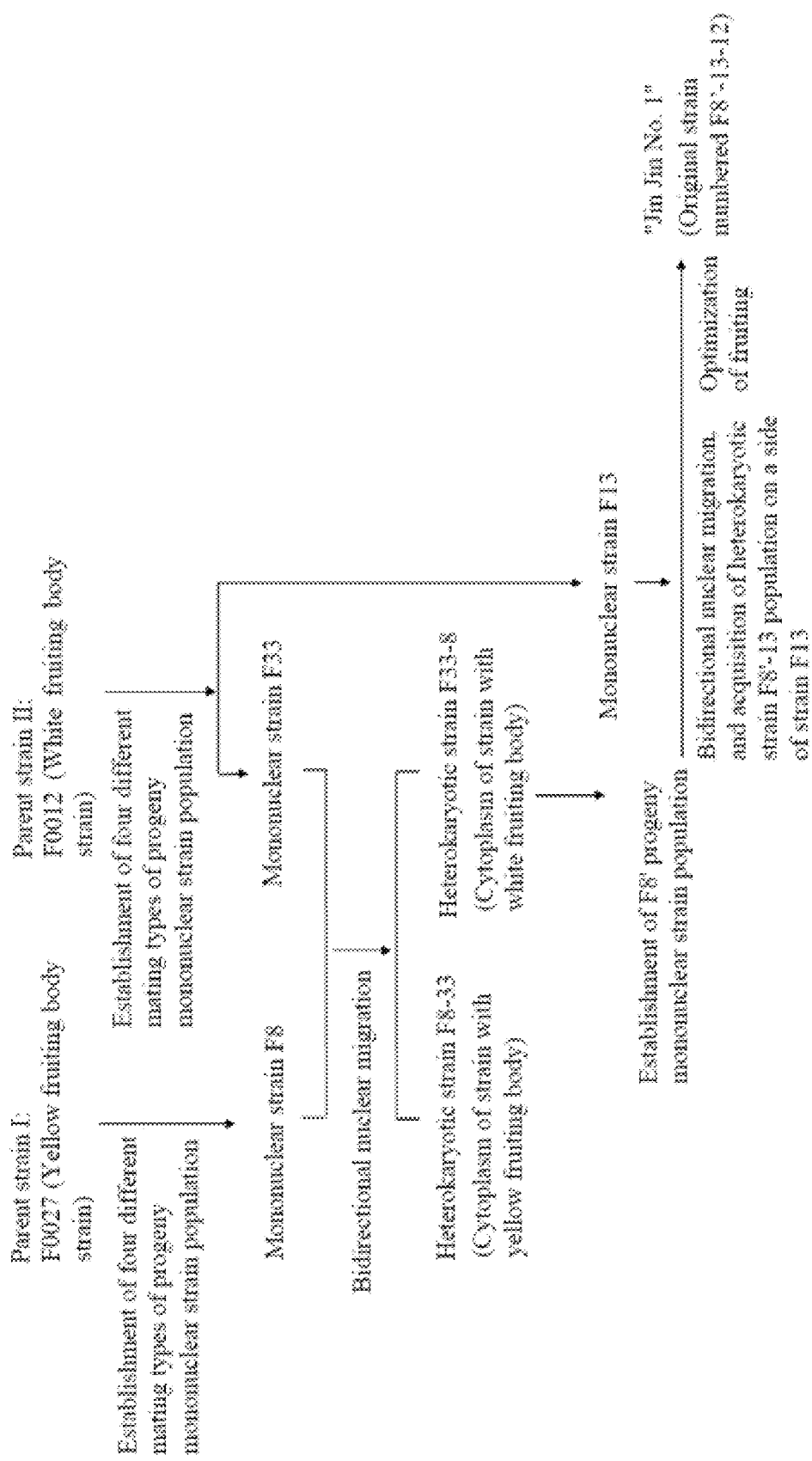
FIG. 1 is a diagram showing a breeding process of a strain "Jin Jin No. 1" according to the present disclosure.

In recent years, based on resource collection and genetic analysis of *Flammlina filiformis*, an Edible Fungi Team of Shanxi Agricultural University had bred a new *Flammlina filiformis* strain "Jin Jin No. 1". The breeding process was shown in FIG. 1. The starting strains used were as follows.

Figure 2:
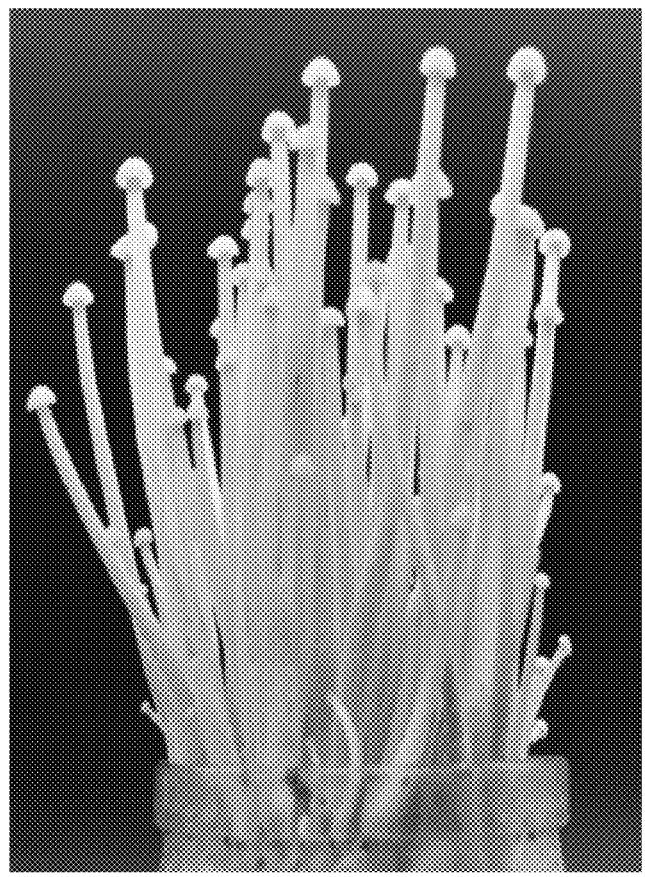
FIG. 2 is a photograph of a yellow parent *Flammlina filiformis* strain F0027 of the strain "Jin Jin No. 1" according to the present disclosure. F0027 has a fruiting body with a golden cap and a golden stipe.

A yellow *Flammlina filiformis* strain F0027 (derived from isolated strains of fruiting body tissues of a strain named "San Ming No. 1", preserved in the Edible Fungi Center of Shanxi Agricultural University, seen FIG. 2 for the photograph), was the most widely main cultivated variety of yellow *Flammlina filiformis* in China for more than 20 years, and was also the most widely used yellow *Flammlina filiformis* variety in genetic background. The fruiting body of the yellow *Flammlina filiformis* strain had a golden cap and a golden stipe, but it would appear obvious browning in a later growth stage.

Figure 3:
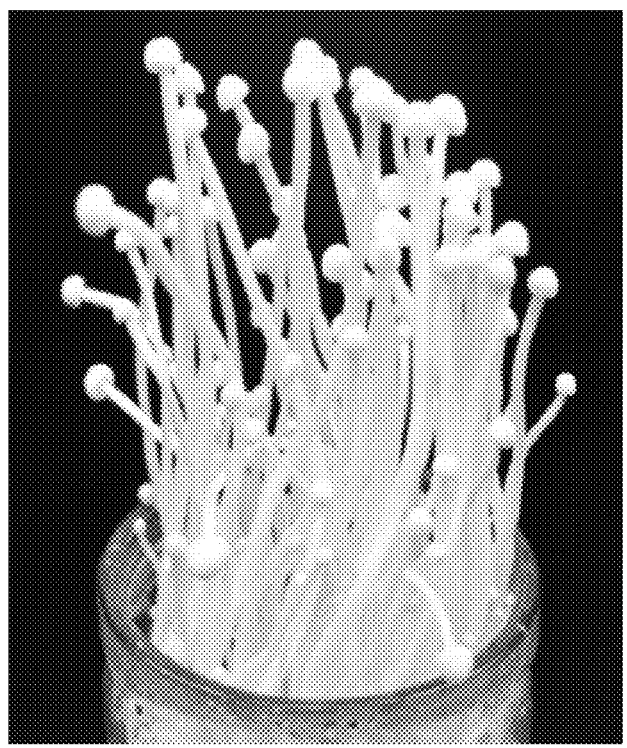
FIG. 3 is a photograph of a white parent *Flammlina filiformis* strain F0012 of the strain "Jin Jin No. 1" according to the present disclosure. F0012 has a fruiting body with a white cap and a white stipe.

A white *Flammlina filiformis* strain F0012 (derived from isolated strains of fruiting body tissues of variety "FV088" introduced from Japan by factory enterprises in Shanxi Province, and now stored in the Edible Fungi Center of Shanxi Agricultural University, seen FIG. 3 for the photograph), was the main cultivated variety of white *Flammlina filiformis* introduced from Japan by factory enterprises, had higher yield and better quality. The fruiting body of the white *Flammlina filiformis* strain had a white cap and a white stipe.

The breeding was mainly based on the method recorded in the authorized national invention patent ZL201710355494.9 (A METHOD FOR BREEDING PALE YELLOW *FLAMMLINA FILIFORMIS*, with an authorization announcement number of 107142257B and an authorization announcement date of Oct. 9, 2020).

Based on the resource collection and genetic analysis of *Flammlina filiformis*, the new strain "Jin Jin No. 1" (an original strain numbered F8'-13-12) was a fertile heterokaryotic strain F8-33-8 with a white strain cytoplasm and a heterozygous nucleus by taking main cultivated strains of yellow *Flammlina filiformis* F0027 (an original variety named San Ming No. 1) and white *Flammlina filiformis* F0012 (a variety imported from Japan by factory enterprises) as starting parent strains and after the collection of *Flammlina filiformis*, isolation of single spore, acquisition of monokaryon hyphae, determination of polarity of monokaryon hyphae and population construction, single-single strain pairing hybridization, bidirectional nuclear migration and acquisition of homonuclear heterogeneous strains, double-single hybridization and cytoplasmic purification, biological difference detection and fertility verification of homonuclear heterogenous strains. Then, through a fruiting experiment, an F8' progeny mononuclear strain population (80-100 strains) was established, and the progeny F8' mononuclear strain population was atypically backcrossed with a mononuclear strain F13 (a progeny mononuclear strain from F0012 strain). Then, through biological characteristics analysis and fruiting screening test, a new fertile heterokaryotic strain "Jin Jin No. 1" (the original strain numbered F8'-13-12) was preferably selected from the heterokaryotic strain population obtained on a side of F13.

2. Identification of the Strain "Jin Jin No. 1"

Figure 4:
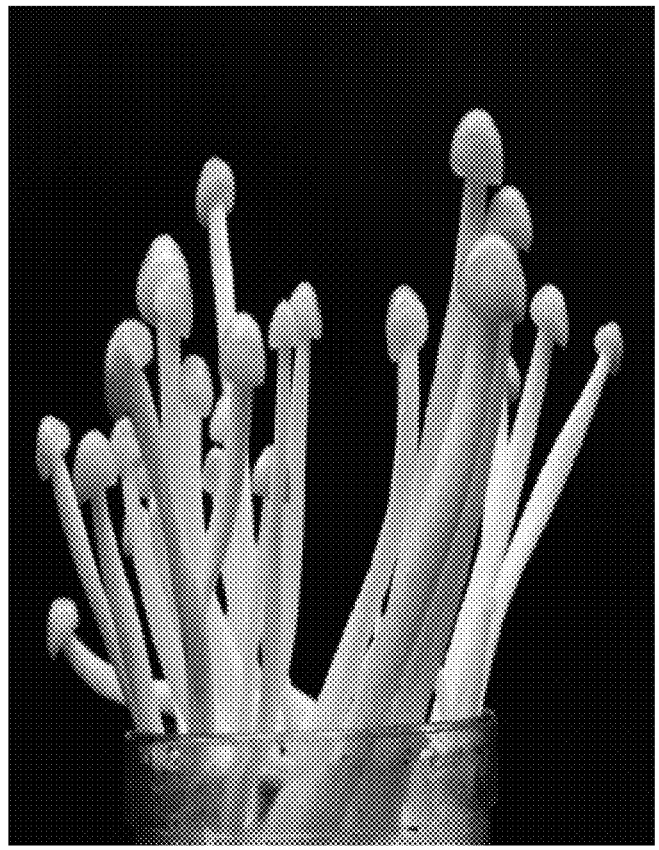
FIG. 4 is a photograph of the strain "Jin Jin No. 1" according to the present disclosure. "Jin Jin No. 1" has a fruiting body with a golden cap and a white stipe.
Figure 5:
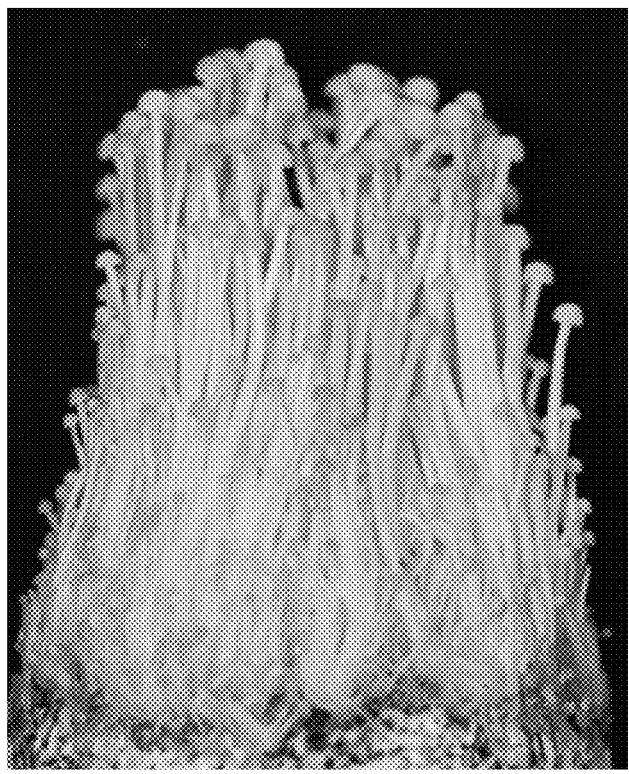
FIG. 5 is a photograph showing the fruiting production of the strain "Jin Jin No. 1" according to the present disclosure. "Jin Jin No. 1" has a fruiting body with a golden cap and a white stipe, and there is no browning at a base during growth.

The hyphae morphology of "Jin Jin No. 1" strain was semi-aerial type, the fruiting body cap had a golden cap with an oblate longitudinal section and a moderate inward curling degree, and the cap was uniform in size and difficult to open. The whole stipe was white with high color uniformity, and there was no browning at a base during growth. "Jin Jin No. 1" had excellent quality and was suitable for fresh sale and canned processing. Compared with common varieties of *Flammlina filiformis*, "Jin Jin No. 1" had strong resistance to bacterial diseases. The photograph of the "Jinjin No. 1" strain was shown in FIG. 4, and the photographs of the fruiting production was shown in FIG. 5.

Preservation of the strain "Jin Jin No. 1"

*Flammlina filiformis* "Jin Jin No. 1", had been preserved on Jun. 16, 2022 in the China General Microbiological Culture Collection Center (CGMCC, at No. 3, Yard 1, Beichen West Road, Chaoyang District, Beijing; Institute of Microbiology, Chinese Academy of Sciences; post code: 100101) with a preservation number of CGMCC No. 40222. The *Flammlina filiformis* "Jin Jin No. 1" was abbreviated as "Jin Jin No. 1".

Cultivation Mode

The "Jin Jin No. 1" strain was suitable for factory production of *Flammlina filiformis* in bottle cultivation and bag cultivation in China, but it had not been found to be different from the biological requirements of the current production conditions.

The optional formula of solid materials for "Jin Jin No. 1" planting substrate included (in parts by mass): 35 parts of rice bran, 35 parts of corncob, 8 parts of brans, 4.9 parts of soybean hulls, 4.9 parts of brewer's spent grain, 4.9 parts of cottonseed hulls, 4.6 parts of beet pulp and 2.1 parts of hull ash.

A moisture content, a pH value and a sugar content of the substrate were detected during the cultivation. Among them, the moisture content (mass percentage) was about 65%, an optimum pH value was 5.5-6.5, and the optimum pH value was 5-6 during the fruiting period.

Hyphae growth period management: a temperature of a culture room was kept at 14-16° C., a humidity was kept at 60%-70%, and a concentration of $CO_2$ was controlled below 3,000 ppm. Under these conditions, the bottle could be filled after 22-23 days of cultivation, and hyphae stimulation could be performed after keeping for 1 day. The first 5 days after inoculation were a hyphae germination stage, and the temperature of the culture room was controlled at 18-20° C. After 5 days of hyphae growth, the temperature was automatically adjusted to 14-16° C. by a refrigeration system. A ventilation system was used to keep good ventilation conditions in the culture room, and the ventilation was controlled by $CO_2$ concentration, so that the $CO_2$ concentration in the culture room was controlled at about 3,000 ppm, and the ventilation air flow reached every corner of the room to make the hyphae grow uniformly, which was convenient for later management.

Fruiting management: the hyphae stimulation could be performed after the hyphae were cultured until the bottle was full and being placed for 1-2 days. It was appropriate to remove an aging fungal coat on a surface of the bottle and smooth the surface. The depth was generally at the beginning of a bottle shoulder. After hyphae stimulation, the bottle was to be replenished with water in time by a water replenishing machine. The temperature range of fruiting was adjusted to 5° C.-16° C. and controlled by stages to stimulate the hyphae to recover and form young buds, the humidity was controlled between 98%-99%, the $CO_2$ concentration was controlled below 2,500 ppm, and an illumination system automatically ran for 8 hours every day on the $4^{th}$ day. Under such conditions, the buds could appear after about 3 days. When the buds grew out of a bottle mouth by 2-3 cm, a paper rolling process was carried out. On the eighth day or so, when the buds grew, the temperature was gradually reduced from 15° C. to 6° C. and the humidity was 90%-95%. The $12^{th}$-$16^{th}$ day was an inhibition period with the temperature being controlled at 3-5° C. and the humidity of 90%, and the illumination system was used for 8 hours every day. After the buds were inhibited, the buds would grow more orderly. When the buds grew 2-3 cm out of the bottle mouth, rolled papers were put on immediately to increase the $CO_2$ concentration in a small range, thus achieving the effect of promoting the stipe and inhibiting the cap. Then the buds in the bottle were immediately transferred to a fertility room with the system temperature set at 7-9° C. After about 7 days, the *Flammlina filiformis* could grow to heights of the rolled papers, about 16 cm, and then could be harvested.

The strain was productively tested in Lingchuan, Jincheng, Shanxi, and Taigu, Jinzhong sequentially, and the main cultivated strain of the parent yellow *Flammlina filiformis* "San Ming No. 1" was used as a control. The results showed that compared with a parent white *Flammlina filiformis* strain F0012, the "Jin Jin No. 1" had an equivalent average yield, an initial harvest period 1-2 days late, and a golden cap. Different from a yellow *Flammlina filiformis* variety "San Ming No. 1" having a yellow stipe and a base being prone to browning during growth, the "Jin Jin No. 1" had a white whole stipe and no browning at the base.

The present disclosure has been described in detail above. For those skilled in the art, the present disclosure can be implemented in a wide range with equivalent parameters, concentrations and conditions without departing from the spirit and scope of the present disclosure and without unnecessary experiments. Although the present disclosure has given specific examples, it is to be understood that the present disclosure can be further improved. In general, according to the principles of the present disclosure, the present application is intended to include any changes, uses or improvements to the present disclosure, including changes made by conventional techniques known in the art, which depart from the disclosed scope in the present application. According to the scope of the following appended claims, some basic features can be applied.

The invention claimed is:

1. A *Flammlina filiformis* a strain "Jin Jin No. 1", wherein the *Flammlina filiformis* strain "Jin Jin No. 1" is deposited under a preservation number of CGMCC No. 40222.

2. A fruiting body, a mycelium, or spores of the *Flammlina filiformis* strain "Jin Jin No. 1" according to claim 1.

3. A method for preparing a *Flammlina filiformis* fruiting body and/or a *Flammlina filiformis* mycelium and/or *Flammlina filiformis* spores, comprising using the *Flammlina filiformis* strain "Jin Jin No. 1" according to claim 1.

4. A method for breeding *Flammlina filiformis*, comprising using the *Flammlina filiformis* strain "Jin Jin No. 1" according to claim 1.

* * * * *